(12) United States Patent
De Rudder et al.

(10) Patent No.: US 11,608,764 B2
(45) Date of Patent: Mar. 21, 2023

(54) DOSING AND MIXING ARRANGEMENT FOR USE IN EXHAUST AFTERTREATMENT

(71) Applicant: Donaldson Company, Inc., Bloomington, MN (US)

(72) Inventors: Korneel De Rudder, Herent (BE); Corine Chauvin, Brussels (BE)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 17/222,274

(22) Filed: Apr. 5, 2021

(65) Prior Publication Data
US 2021/0239022 A1 Aug. 5, 2021

Related U.S. Application Data

(60) Continuation of application No. 16/395,472, filed on Apr. 26, 2019, now Pat. No. 10,968,800, which is a
(Continued)

(51) Int. Cl.
*F01N 3/20* (2006.01)
*F01N 3/36* (2006.01)
(Continued)

(52) U.S. Cl.
CPC ........ *F01N 3/2066* (2013.01); *B01F 23/2132* (2022.01); *B01F 25/102* (2022.01);
(Continued)

(58) Field of Classification Search
CPC .......... F01N 3/2066; F01N 3/36; F01N 13/08; F01N 2470/02; F01N 2470/18;
(Continued)

(56) References Cited

U.S. PATENT DOCUMENTS

| 2,561,457 A | 7/1951 | Beales et al. |
| 2,898,202 A | 8/1959 | Houdry et al. |

(Continued)

FOREIGN PATENT DOCUMENTS

| DE | 40 12 411 A1 | 10/1991 |
| DE | 42 03 807 A1 | 8/1993 |

(Continued)

OTHER PUBLICATIONS

Akiyoshi et al., "Development of Efficient Urea-SCR Systems for EPA 2010-Compliant Medium Duty Diesel Vehicles" Apr. 12, 2011, *SAE International*, 8 pages.
(Continued)

*Primary Examiner* — Audrey B. Walter
(74) *Attorney, Agent, or Firm* — Merchant & Gould P.C.

(57) ABSTRACT

A dosing and mixing arrangement includes a mixing tube having a constant diameter along its length. At least a first portion of the mixing tube includes a plurality of apertures. The arrangement also includes a swirl structure for causing exhaust flow to swirl outside of the first portion of the mixing tube in one direction along a flow path that extends at least 270 degrees around a central axis of the mixing tube. The arrangement is configured such that the exhaust enters an interior of the mixing tube through the apertures as the exhaust swirls along the flow path. The exhaust entering the interior of the mixing tube through the apertures has a tangential component that causes the exhaust to swirl around the central axis within the interior of the mixing tube. The arrangement also includes a doser for dispensing a reactant into the interior of the mixing tube.

21 Claims, 15 Drawing Sheets

Related U.S. Application Data continuation of application No. 14/990,434, filed on Jan. 7, 2016, now Pat. No. 10,294,841, which is a division of application No. 13/166,582, filed on Jun. 22, 2011, now Pat. No. 9,670,811.

(60) Provisional application No. 61/357,418, filed on Jun. 22, 2010.

(51) Int. Cl.
    *B01F 23/21* (2022.01)
    *B01F 25/10* (2022.01)
    *F01N 13/08* (2010.01)
    *B01F 23/213* (2022.01)
    *B01F 25/00* (2022.01)

(52) U.S. Cl.
    CPC ............. *F01N 3/36* (2013.01); *F01N 13/08* (2013.01); *B01F 2025/931* (2022.01); *F01N 2470/02* (2013.01); *F01N 2470/18* (2013.01); *F01N 2610/02* (2013.01); *F01N 2610/1453* (2013.01)

(58) Field of Classification Search
    CPC ......... F01N 2610/02; F01N 2610/1453; B01F 23/2132; B01F 25/102; B01F 2025/931
    See application file for complete search history.

(56) References Cited

U.S. PATENT DOCUMENTS

| | | |
|---|---|---|
| 2,946,651 A | 7/1960 | Houdry et al. |
| 3,048,376 A | 8/1962 | Howald |
| 3,072,457 A | 1/1963 | Bloch |
| 3,779,335 A | 12/1973 | Chelminski |
| 3,797,240 A | 3/1974 | Inoue et al. |
| 3,835,645 A | 9/1974 | Zoleta |
| 3,863,678 A | 2/1975 | Pettersson et al. |
| 3,867,508 A | 2/1975 | Hass |
| 3,964,875 A | 6/1976 | Chang |
| 4,498,786 A | 2/1985 | Ruscheweyh |
| 4,902,487 A | 2/1990 | Cooper et al. |
| 4,916,897 A | 4/1990 | Hayashi et al. |
| 5,138,834 A | 8/1992 | Maund |
| 5,272,871 A | 12/1993 | Oshima et al. |
| 5,315,824 A | 5/1994 | Takeshima |
| 5,489,153 A | 2/1996 | Berner et al. |
| 5,540,897 A | 7/1996 | Chu et al. |
| 5,601,792 A | 2/1997 | Hug et al. |
| 5,653,105 A | 8/1997 | Noirot et al. |
| 5,662,869 A | 9/1997 | Abe et al. |
| 5,693,299 A | 12/1997 | Chopin et al. |
| 5,701,735 A | 12/1997 | Kawaguchi |
| 5,772,972 A | 6/1998 | Hepburn et al. |
| 5,884,474 A | 3/1999 | Topsøe |
| 5,916,134 A | 6/1999 | Yang et al. |
| 5,941,069 A | 8/1999 | Heath |
| 5,992,141 A | 11/1999 | Berriman |
| 5,996,339 A * | 12/1999 | Gottberg .................. F01N 3/28 60/299 |
| 6,041,594 A | 3/2000 | Brenner |
| 6,050,088 A | 4/2000 | Brenner |
| 6,192,677 B1 | 2/2001 | Tost |
| 6,199,375 B1 | 3/2001 | Russell |
| 6,294,141 B1 | 9/2001 | Twigg et al. |
| 6,312,650 B1 | 11/2001 | Frederiksen et al. |
| 6,314,722 B1 | 11/2001 | Matros et al. |
| 6,401,449 B1 | 6/2002 | Hofmann |
| 6,442,933 B2 | 9/2002 | Rusch |
| 6,444,177 B1 | 9/2002 | Müller et al. |
| 6,449,947 B1 | 9/2002 | Liu et al. |
| 6,539,708 B1 | 4/2003 | Hofmann et al. |
| 6,546,717 B1 | 4/2003 | Chandler et al. |
| 6,606,854 B1 | 8/2003 | Siefker |
| 6,680,037 B1 | 1/2004 | Allansson et al. |
| 6,689,327 B1 | 2/2004 | Reck et al. |
| 6,712,869 B2 | 3/2004 | Cheng et al. |
| 6,722,123 B2 | 4/2004 | Liu et al. |
| 6,722,124 B2 | 4/2004 | Pawson et al. |
| 6,770,252 B2 | 8/2004 | Cheng |
| 6,824,743 B1 | 11/2004 | Pawson et al. |
| 6,863,874 B1 | 3/2005 | Twigg |
| 6,889,500 B1 | 5/2005 | Martinez |
| 6,935,105 B1 | 8/2005 | Page et al. |
| 7,104,251 B2 | 9/2006 | Kim |
| 7,168,241 B2 | 1/2007 | Rudelt et al. |
| 7,448,206 B2 | 11/2008 | Meingast et al. |
| 7,482,986 B2 | 1/2009 | Wu et al. |
| 7,537,083 B2 | 5/2009 | Frederiksen |
| 7,581,389 B2 | 9/2009 | Crawley et al. |
| 7,712,305 B2 | 5/2010 | Kapsos et al. |
| 7,877,983 B2 | 2/2011 | Kunkel et al. |
| 7,896,645 B2 | 3/2011 | Loving |
| 8,015,802 B2 | 9/2011 | Nishiyama et al. |
| 8,033,104 B2 | 10/2011 | Zhang |
| 8,359,838 B2 | 1/2013 | Yamazaki et al. |
| 8,499,548 B2 | 8/2013 | De Rudder et al. |
| 9,670,811 B2 | 6/2017 | De Rudder et al. |
| 10,294,841 B2 | 5/2019 | De Rudder et al. |
| 10,968,800 B2 | 4/2021 | De Rudder et al. |
| 2002/0053287 A1 | 5/2002 | Natarius |
| 2002/0162322 A1 | 11/2002 | Ganzmann et al. |
| 2003/0003029 A1 | 1/2003 | Rogers et al. |
| 2003/0079467 A1 | 5/2003 | Liu et al. |
| 2003/0108457 A1 | 6/2003 | Gault et al. |
| 2003/0226539 A1 | 12/2003 | Kim |
| 2004/0040782 A1 | 3/2004 | Frederiksen |
| 2004/0237511 A1 | 12/2004 | Ripper et al. |
| 2006/0218902 A1 | 10/2006 | Arellano et al. |
| 2006/0275192 A1 | 12/2006 | Gabrielsson et al. |
| 2007/0101703 A1 | 5/2007 | Kanaya et al. |
| 2007/0144158 A1 | 6/2007 | Girard |
| 2007/0189936 A1 | 8/2007 | Suwabe et al. |
| 2007/0274877 A1 | 11/2007 | Bush et al. |
| 2008/0041052 A1 | 2/2008 | Doring et al. |
| 2008/0047260 A1 | 2/2008 | Kapsos et al. |
| 2008/0141662 A1 | 6/2008 | Schuster et al. |
| 2008/0245060 A1 | 10/2008 | Stieglbauer |
| 2009/0000287 A1 | 1/2009 | Blaisdell et al. |
| 2009/0019843 A1 | 1/2009 | Levin et al. |
| 2009/0173063 A1 | 7/2009 | Boorse et al. |
| 2009/0205327 A1 | 8/2009 | Kabat et al. |
| 2009/0313979 A1 | 12/2009 | Kowada |
| 2009/0320726 A1 | 12/2009 | Loving |
| 2010/0101222 A1 | 4/2010 | Oesterle et al. |
| 2010/0107612 A1 | 5/2010 | Yamazaki et al. |
| 2010/0139258 A1 | 6/2010 | Hackett et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0257849 A1 | 10/2010 | Kowada |
| 2010/0263359 A1 | 10/2010 | Haverkamp et al. |
| 2011/0094206 A1 | 4/2011 | Liu et al. |
| 2011/0113759 A1 | 5/2011 | Tilinski et al. |
| 2011/0167810 A1 | 7/2011 | Lebas et al. |
| 2011/0219755 A1 | 9/2011 | Muller-Haas |
| 2014/0230411 A1 * | 8/2014 | De Rudder ........... F01N 3/2892 60/274 |

FOREIGN PATENT DOCUMENTS

| | | |
|---|---|---|
| DE | 199 55 013 A1 | 5/2001 |
| DE | 44 17 238 C2 | 3/2003 |
| DE | 20 2006 011281 | 9/2006 |
| DE | 10 2004 020 138 B4 | 2/2007 |
| DE | 10 2006 019 052 A1 | 10/2007 |
| DE | 10 2007 009890 A1 | 9/2008 |
| DE | 10 2007 012790 A1 | 9/2008 |
| DE | 20 2007 010 324 U1 | 1/2009 |
| DE | 10 2008 009 564 A1 | 8/2009 |
| DE | 10 2008 031136 A1 | 1/2010 |
| DE | 10 2008 048 796 A1 | 3/2010 |
| DE | 10 2009 053 950 A1 | 5/2011 |

(56) References Cited

FOREIGN PATENT DOCUMENTS

| | | |
|---|---|---|
| EP | 0 319 299 A2 | 6/1989 |
| EP | 0 470 361 A1 | 2/1992 |
| EP | 0 555 746 A1 | 8/1993 |
| EP | 0 628 706 A2 | 12/1994 |
| EP | 0 666 099 A1 | 8/1995 |
| EP | 0 758 713 A1 | 2/1997 |
| EP | 0 839 996 A2 | 5/1998 |
| EP | 0 849 441 A1 | 6/1998 |
| EP | 0 862 941 A2 | 9/1998 |
| EP | 1 054 722 A1 | 11/2000 |
| EP | 0 779 415 B1 | 5/2001 |
| EP | 1 262 644 A2 | 12/2002 |
| EP | 1 109 993 B1 | 5/2003 |
| EP | 1 054 139 B1 | 3/2004 |
| EP | 1 712 753 A2 | 10/2006 |
| EP | 1 770 253 A1 | 4/2007 |
| EP | 1 890 016 A2 | 2/2008 |
| EP | 1 947 307 A1 | 7/2008 |
| EP | 1 712 756 B1 | 3/2009 |
| EP | 2 111 916 A1 | 10/2009 |
| EP | 2 128 398 A1 | 12/2009 |
| EP | 1 781 908 B1 | 3/2010 |
| EP | 2 168 672 A1 | 3/2010 |
| EP | 2 204 556 A1 | 7/2010 |
| EP | 2 295 756 A1 | 3/2011 |
| EP | 2 325 448 A2 | 5/2011 |
| EP | 2 204 556 B1 | 5/2012 |
| EP | 2 465 602 A2 | 6/2012 |
| EP | 1 770 253 B1 | 9/2012 |
| EP | 2 465 602 B1 | 5/2013 |
| EP | 2 128 398 B1 | 12/2013 |
| FI | 20106317 | 12/2010 |
| FI | 20115569 | 6/2011 |
| FR | 2 384 206 A1 | 10/1978 |
| FR | 2 861 137 A1 | 4/2005 |
| FR | 2 891 305 A1 | 3/2007 |
| GB | 2 381 218 A | 4/2003 |
| GB | 2 416 718 A | 2/2006 |
| GB | 2 434 557 A | 8/2007 |
| JP | 11-166410 | 6/1999 |
| JP | 2003-193823 | 7/2003 |
| JP | 2003-232218 | 8/2003 |
| JP | 2005-113826 | 4/2005 |
| JP | 2005-155404 | 6/2005 |
| JP | 2005-273564 | 10/2005 |
| JP | 2006-105414 | 4/2006 |
| JP | 2006-205077 | 8/2006 |
| JP | 2008-128093 | 6/2008 |
| JP | 2008-215286 | 9/2008 |
| JP | 2008-274878 | 11/2008 |
| JP | 2008-309000 | 12/2008 |
| JP | 2009-144614 | 7/2009 |
| JP | 2009-150338 | 7/2009 |
| JP | 2009-270449 | 11/2009 |
| JP | 2010101236 A * | 5/2010 |
| JP | 2010-101236 | 6/2010 |
| JP | 2011-99390 | 5/2011 |
| WO | WO 97/01387 | 1/1997 |
| WO | WO 99/44725 | 9/1999 |
| WO | WO 01/04466 A1 | 1/2001 |
| WO | WO 01/042630 A2 | 6/2001 |
| WO | WO 03/004839 A1 | 1/2003 |
| WO | WO 03/036056 A1 | 5/2003 |
| WO | WO 03/104624 A2 | 12/2003 |
| WO | WO 2004/033866 A1 | 4/2004 |
| WO | WO 2004/038192 A1 | 5/2004 |
| WO | WO 2004/113690 A1 | 12/2004 |
| WO | WO 2005/073524 A1 | 8/2005 |
| WO | WO 2006/001855 A2 | 1/2006 |
| WO | WO 2006/009056 A1 | 1/2006 |
| WO | WO 2006/010922 A1 | 2/2006 |
| WO | WO 2006/014129 A1 | 2/2006 |
| WO | WO 2008/024535 A2 | 2/2008 |
| WO | WO 2008/061734 A1 | 5/2008 |
| WO | WO 2008/111254 A1 | 9/2008 |
| WO | WO 2008/144385 A2 | 11/2008 |
| WO | WO 2009/012885 A1 | 1/2009 |
| WO | WO 2009/024815 A2 | 2/2009 |
| WO | WO 2009/054123 A1 | 4/2009 |
| WO | WO 2009/157995 A1 | 12/2009 |
| WO | WO 2010/032077 A1 | 3/2010 |
| WO | WO 2011/106487 A1 | 9/2011 |
| WO | WO 2011/163395 A1 | 12/2011 |

OTHER PUBLICATIONS

Alano et al., "Compact SCR for Passenger Cars" Apr. 12, 2011, *SAE International*, 9 pages.
International Search Report and Written Opinion for PCT/US2009/068529 dated Mar. 16, 2010.
International Search Report and Written Opinion for PCT/US2011/041493 dated Oct. 5, 2011.
Jungmin Seo, "Aftertreatment Package Design for SCR Performance Optimization" Apr. 12, 2011, *SAE International*, 7 pages.
Machine English translation of JP2005-155404A.
Machine English translation of JP2009-150338.
Machine translation of DE 4012411, which was previously cited.
Notice of Opposition to European Patent No. 2585693, dated Mar. 12, 2018 (18 pages).
Reply to Notice of Opposition to European Patent No. 2585693, dated Aug. 3, 2018 (11 pages).
Third Party Observation for Application No. EP 20110729001 on Jan. 10, 2014.
Third Party Observation for Application No. EP 20110729001 on Jan. 15, 2014.
Third Party Observation for application No. EP20110729001 dated Dec. 8, 2014 (5 pages).
Third Party Observations for application No. EP 11729001.5, dated Oct. 10, 2016 (9 pages).

\* cited by examiner

DOSING AND MIXING ARRANGEMENT FOR USE IN EXHAUST AFTERTREATMENT

CROSS-REFERENCE TO RELATED APPLICATIONS

This application is a continuation of application Ser. No. 16/395,472, filed Apr. 26, 2019, now U.S. Pat. No. 10,968,800, which is a continuation of application Ser. No. 14/990,434, filed Jan. 7, 2016, now U.S. Pat. No. 10,294,841, which is a divisional of application Ser. No. 13/166,582, filed Jun. 22, 2011, now U.S. Pat. No. 9,670,811, which application claims the benefit of provisional application Ser. No. 61/357,418, filed Jun. 22, 2010 and entitled "Dosing and Mixing Arrangement for Use in Exhaust Aftertreatment," which applications are incorporated herein by reference in their entirety.

BACKGROUND

Vehicles equipped with internal combustion engines (e.g., diesel engines) typically include exhaust systems that have aftertreatment components such as selective catalytic reduction (SCR) catalyst devices, lean NOx catalyst devices, or lean NOx trap devices to reduce the amount of undesirable gases, such as nitrogen oxides (NOx) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Therefore, there is a need for a flow device that provides a uniform mixture of exhaust gases and reactants.

SCR exhaust treatment devices focus on the reduction of nitrogen oxides. In SCR systems, a reductant (e.g., aqueous urea solution) is dosed into the exhaust stream. The reductant reacts with nitrogen oxides while passing through an SCR substrate to reduce the nitrogen oxides to nitrogen and water. When aqueous urea is used as a reductant, the aqueous urea is converted to ammonia which in turn reacts with the nitrogen oxides to covert the nitrogen oxides to nitrogen and water. Dosing, mixing and evaporation of aqueous urea solution can be challenging because the urea and by-products from the reaction of urea to ammonia can form deposits on the surfaces of the aftertreatment devices. Such deposits can accumulate over time and partially block or otherwise disturb effective exhaust flow through the aftertreatment device.

SUMMARY

An aspect of the present disclosure relates to a dosing and mixing unit for use in exhaust aftertreatment. The dosing and mixing unit includes a mixing tube having a generally constant diameter along the length of the mixing tube. The mixing tube includes a first portion having a plurality of apertures (e.g., perforations) and a second portion having a solid wall without any apertures. The mixing tube includes a first end portioned adjacent the first portion of the mixing tube and a second end positioned adjacent the second portion of the mixing tube. The first end of the mixing tube is closed to exhaust flow and a doser is mounted at the first end of the mixing tube. The second end of the mixing tube is open and functions as an outlet for the mixing tube. The dosing and mixing unit also includes a swirling structure for swirling exhaust generally circumferentially (i.e., tangentially) around an exterior of the first portion of the mixing tube. The swirling exhaust enters the first portion of the mixing tube through the apertures of the mixing tube. The exhaust entering the mixing tube through the apertures has a tangential flow component that causes the flow to swirl within the mixing tube about a central axis of the mixing tube. The swirling exhaust then flows from the first portion of the mixing tube to the second portion of the mixing tube and exits the mixing tube through the second end of the mixing tube. The doser injects reactant into the interior of the mixing tube and the swirling motion of the exhaust within the mixing tube assists in uniformly mixing the reactant into the exhaust while the exhaust is within the mixing tube.

Another aspect of the present disclosure relates to a dosing and mixing unit for use in exhaust aftertreatment. The dosing and mixing unit includes a mixing tube having a plurality of apertures. The dosing and mixing unit also includes a swirl housing partially surrounding the mixing tube. The dosing and mixing unit further includes an inlet pipe attached to a side of the swirl housing and extending out from the side of the swirl housing in an angled tangential direction in relation to a central axis of the mixing tube. The dosing and mixing unit also includes a swirl structure for causing exhaust flow to swirl along a flow path around the central axis of the mixing tube. In addition, the dosing and mixing unit includes a doser for dispensing a reactant into the interior of the mixing tube.

In certain embodiments, the swirling structure can include different types of structures for causing the exhaust to swirl about the mixing tube. In one embodiment, the swirling structure can include an outer housing that at least partially encloses the mixing tube and that directs exhaust flow in a swirling motion about the mixing tube. In another embodiment, the swirling structure can include a baffle that directs exhaust flow in a swirling motion about the mixing tube.

In certain embodiments, dosing and mixing units in accordance with the principles of the present disclosure can be used as part of an SCR exhaust treatment system for reducing nitrogen oxides to nitrogen and water. In such embodiments, the dosing and mixing units can be used to dose and mix reductants such as aqueous urea or ammonia at locations upstream from SCR substrates. In other embodiments, dosing and mixing units in accordance with the principles of the present disclosure can be used to mix other types of reactants such as hydrocarbons (e.g., fuels such as diesel fuel or syngas) upstream from other types of substrates such as lean NOx catalyst devices, lean NOx traps, catalytic converters such as diesel oxidation catalyst (DOC) substrates and diesel particulate filter (DPF) substrates.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
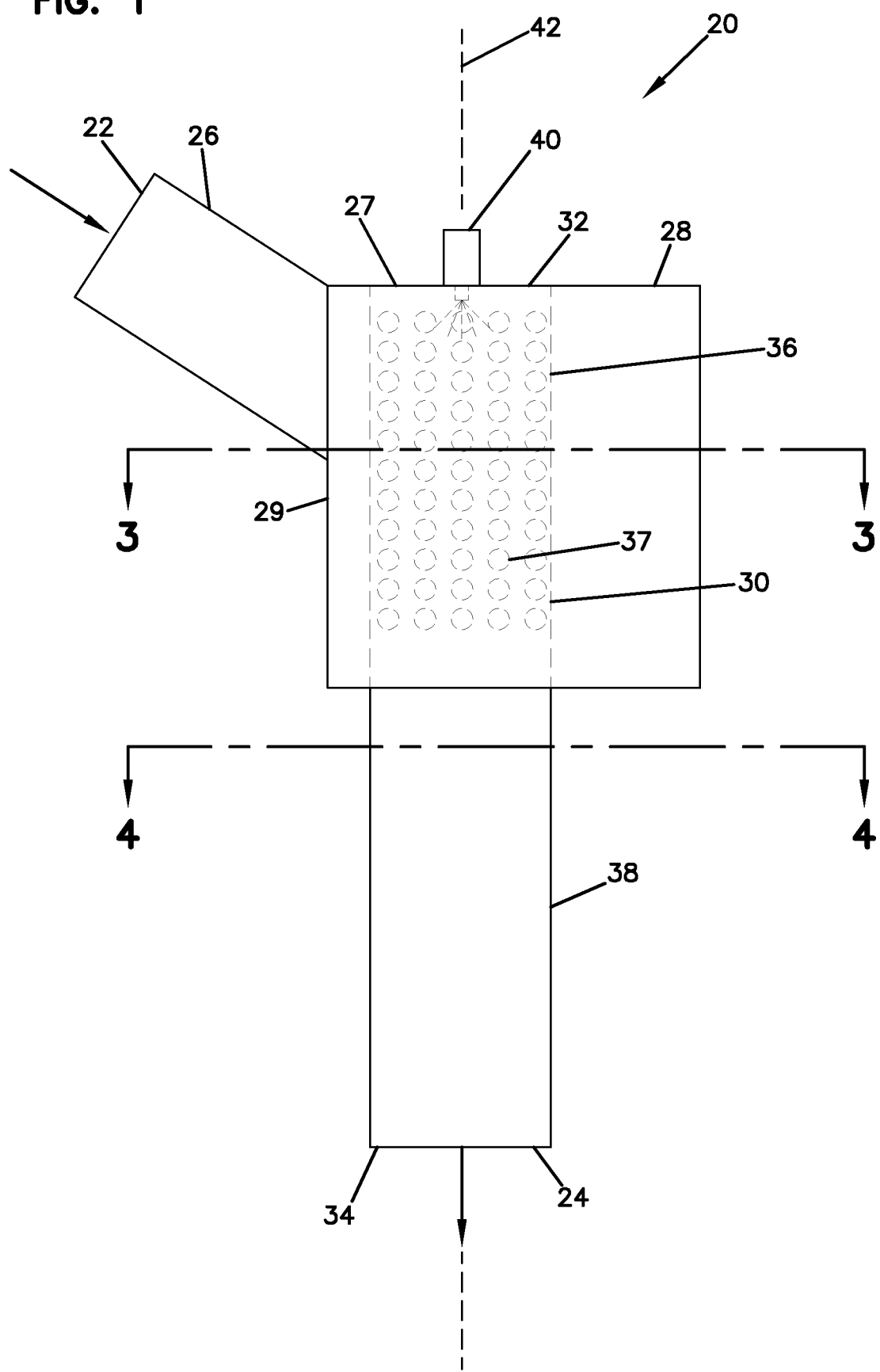
FIG. 1 is a front view of a doser and mixing unit having features that are examples of aspects in accordance with the principles of the present disclosure.
Figure 4:
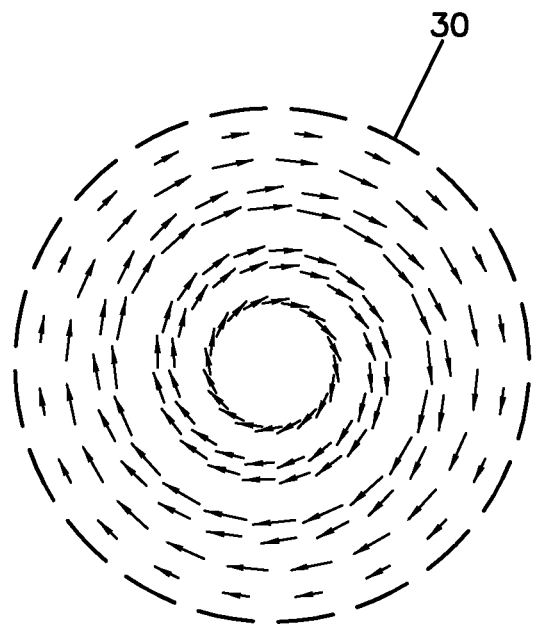
FIG. 4 is a cross-sectional view taken along section line 4-4 of FIG. 1.
Figure 5:
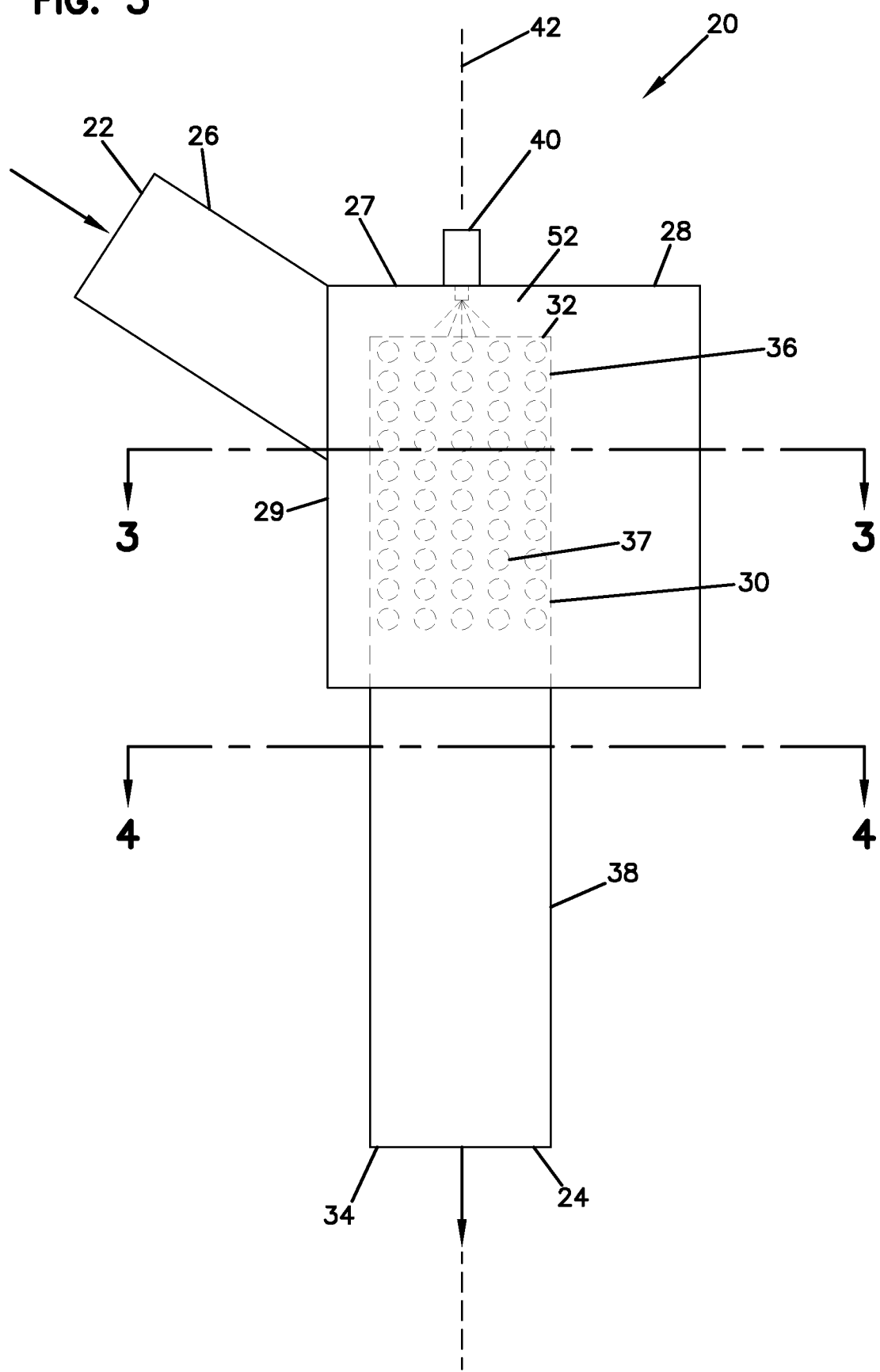
FIG. 5 is a front view of an exemplary doser and mixing unit in accordance with the principles of the present disclosure.
Figure 6:
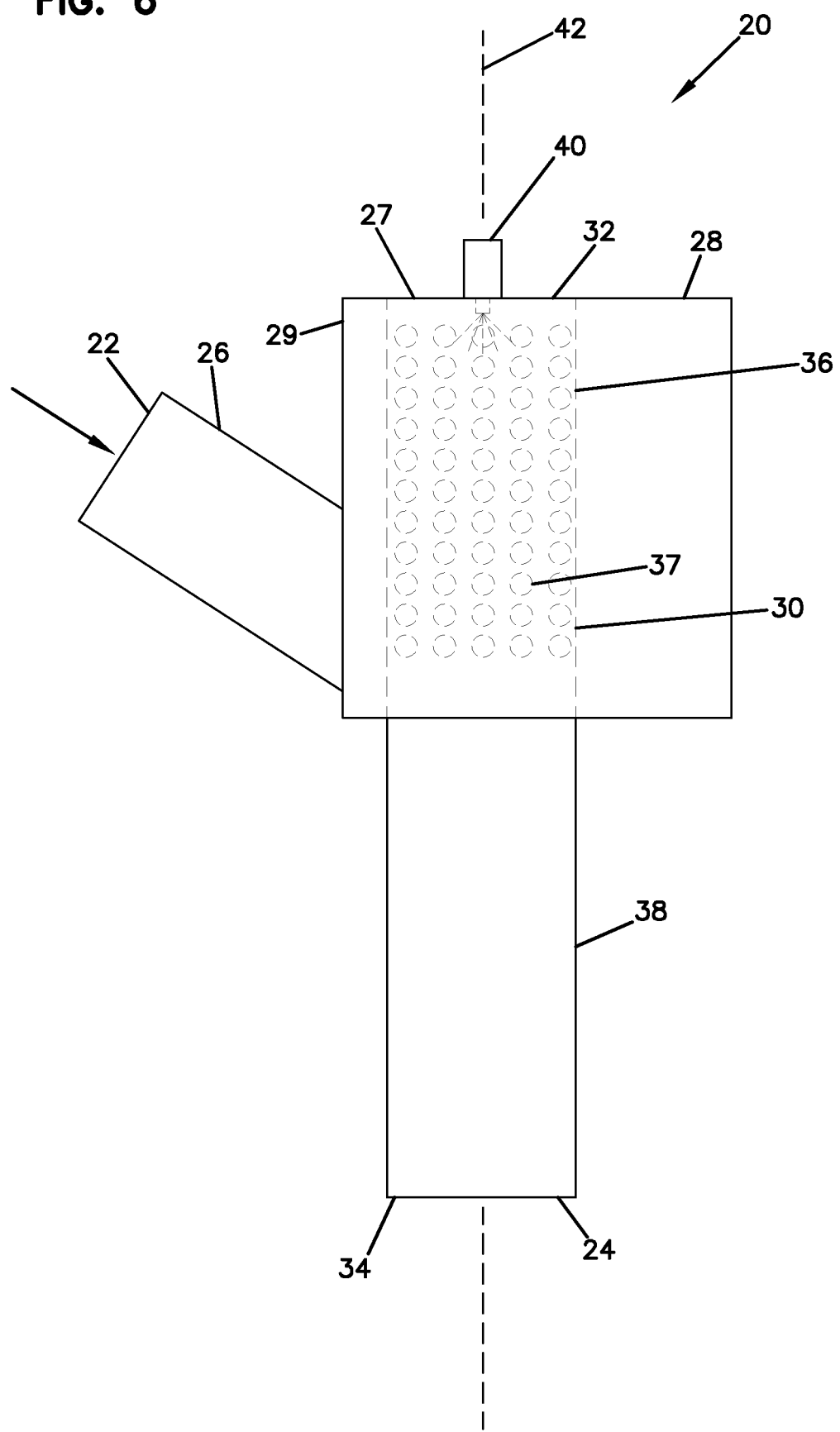
FIG. 6 is a front view of another exemplary doser and mixing unit in accordance with the principles of the present disclosure.
Figure 7:
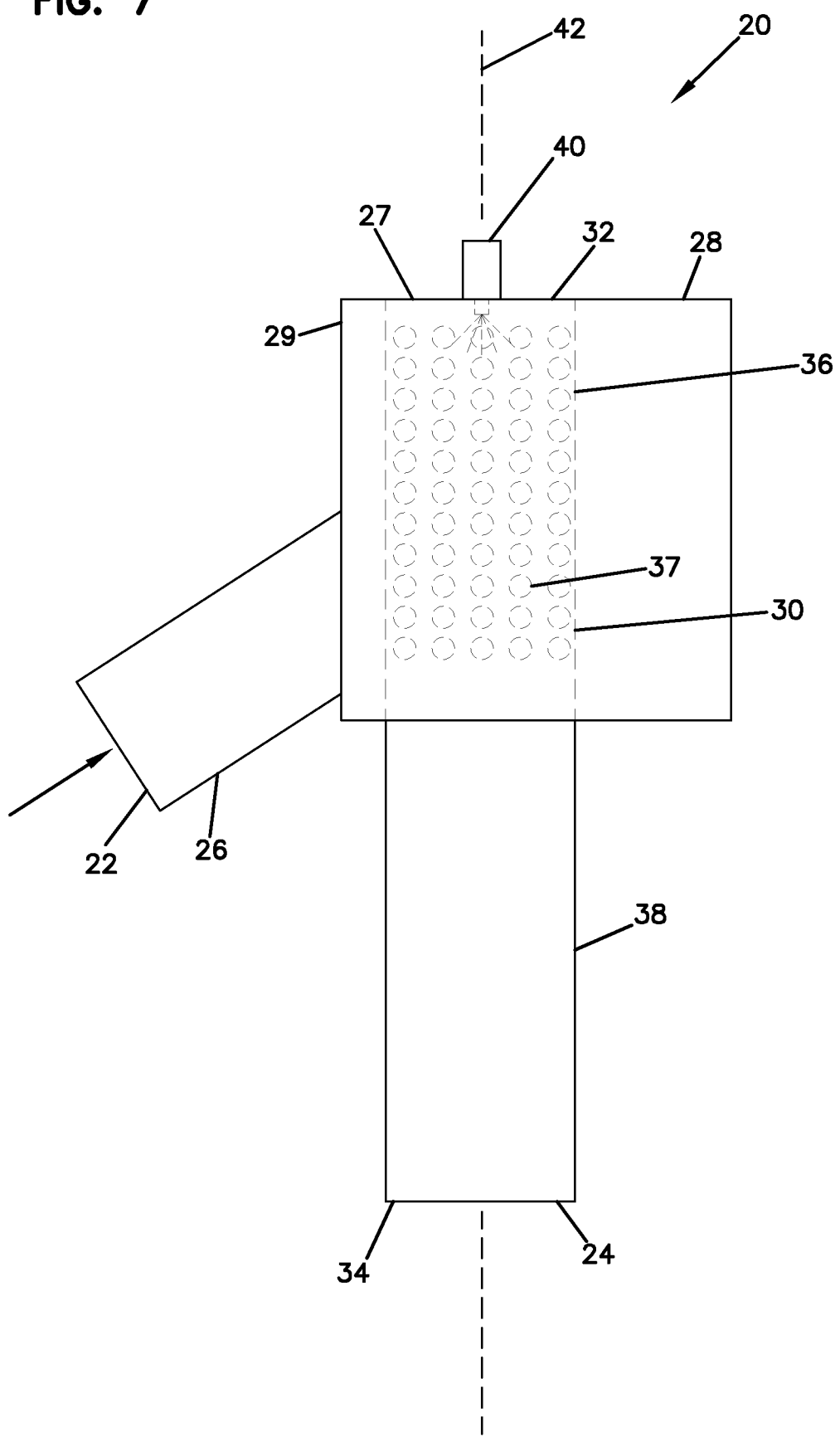
FIG. 7 is a front view of still another exemplary doser and mixing unit in accordance with the principles of the present disclosure.

FIGS. 1-8 show a dosing and mixing unit 20 in accordance with the principles of the present disclosure. The dosing and mixing unit 20 includes an inlet 22 and an outlet 24. The inlet 22 is formed by an inlet pipe 26 that extends to a swirl housing 28. The dosing and mixing unit 20 also includes a mixing tube 30 having a first end 32 positioned within the swirl housing 28 and a second end 34 that forms the outlet 24 of the dosing and mixing unit 20. The inlet pipe 26 is attached to a side 29 of the swirl housing 28 and extends out from the side 29 of the swirl housing 28 in an angled tangential direction in relation to a central axis 42 of the mixing tube 30. As is illustrated in FIGS. 1, 6 and 7, the inlet pipe 26 can be attached to a top portion of the side 27 of swirl housing 28 (see FIG. 1) or a lower portion of the side 27 of swirl housing 28 (see FIG. 6. The inlet pipe 26 can also have different angles in relation to the central axis 42 such that the exhaust flow enters the swirl housing 28 in a direction towards a bottom of the swirl housing 28 (see FIGS. 1 and 6) or towards a top end 27 of swirl housing 28 (see FIG. 7). In other embodiments (not shown), the inlet pipe 26 is attached to the top end 27 of swirl housing 28 in an angled tangential direction in relation to a central axis 42 of the mixing tube 30. The angle between the inlet pipe 26 and the central axis 42 is in some embodiment an oblique angle.

The mixing tube 30 has a first portion 36 positioned adjacent to the first end 32 of the mixing tube 30 and a second portion 38 positioned adjacent to the second end 34 of the mixing tube 30. The first portion 36 has a plurality of apertures 37 (e.g., perforations) and the second portion 38 has a solid wall without any apertures. The apertures 37 can be formed as circles, squares, slots or any other shape. The dosing and mixing unit 20 also includes a doser 40 mounted to the top end 27 of the swirl housing 28 adjacent to the first end 32 of the mixing tube 30. The doser 40 is adapted for dispensing reactant into an interior region of the mixing tube 30.

Figure 2:
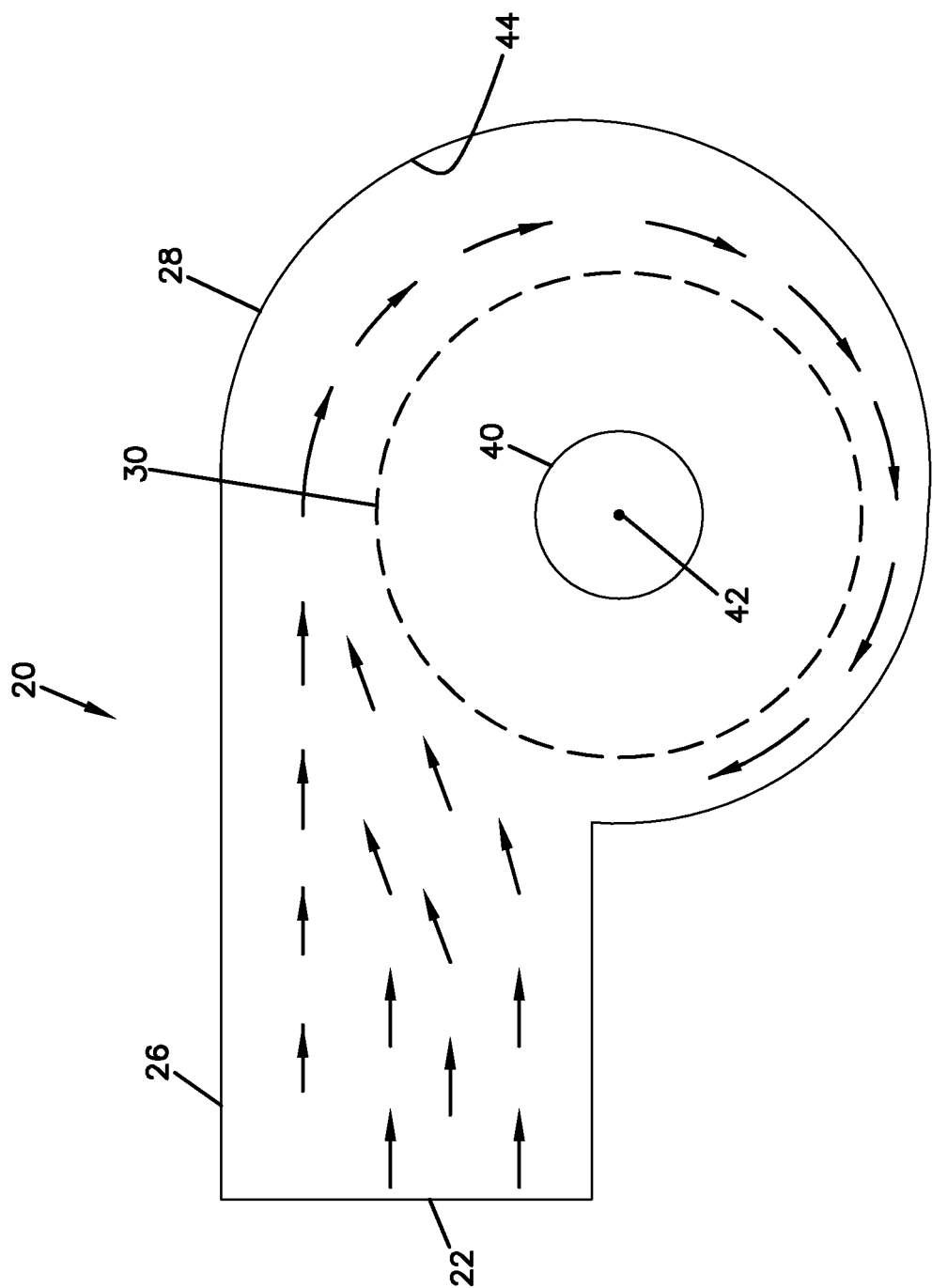
FIG. 2 is a top view of the doser and mixing unit of FIG. 1.

In use of the dosing and mixing unit 20, exhaust enters the dosing and mixing unit 20 through the inlet 22 and is swirled circumferentially (i.e., tangentially) through a swirl structure about the exterior of the first portion 36 of the mixing tube 30 by the swirl housing 28. As the exhaust flow swirls circumferentially around the first portion 36 of the mixing tube 30, the exhaust gas enters the interior of the mixing tube 30 through the apertures 37. The exhaust flow entering the interior of the mixing tube 30 through the apertures 37 has a tangential/circumferential flow component that causes the exhaust to swirl within the interior of the mixing tube 30. The doser 40 dispenses reactant into the swirling exhaust within the interior of the mixing tube where the swirling action of the exhaust assists in uniformly mixing the reactant within the exhaust. Swirling flow of the exhaust continues from the first portion 36 of the mixing tube 30 to the second portion 38 of the mixing tube 30 whereby mixing is enhanced as the exhaust moves through the length of the mixing tube 30. After the swirling exhaust has traveled through the mixing tube in a direction extending from the first end 32 to the second end 34 of the mixing tube 30, the exhaust exits the dosing and mixing unit 20 through the outlet 24. As is seen in FIG. 2, the swirl structure has in some embodiments a cross-section that gradually decreases along the exhaust flow path.

Figure 8:
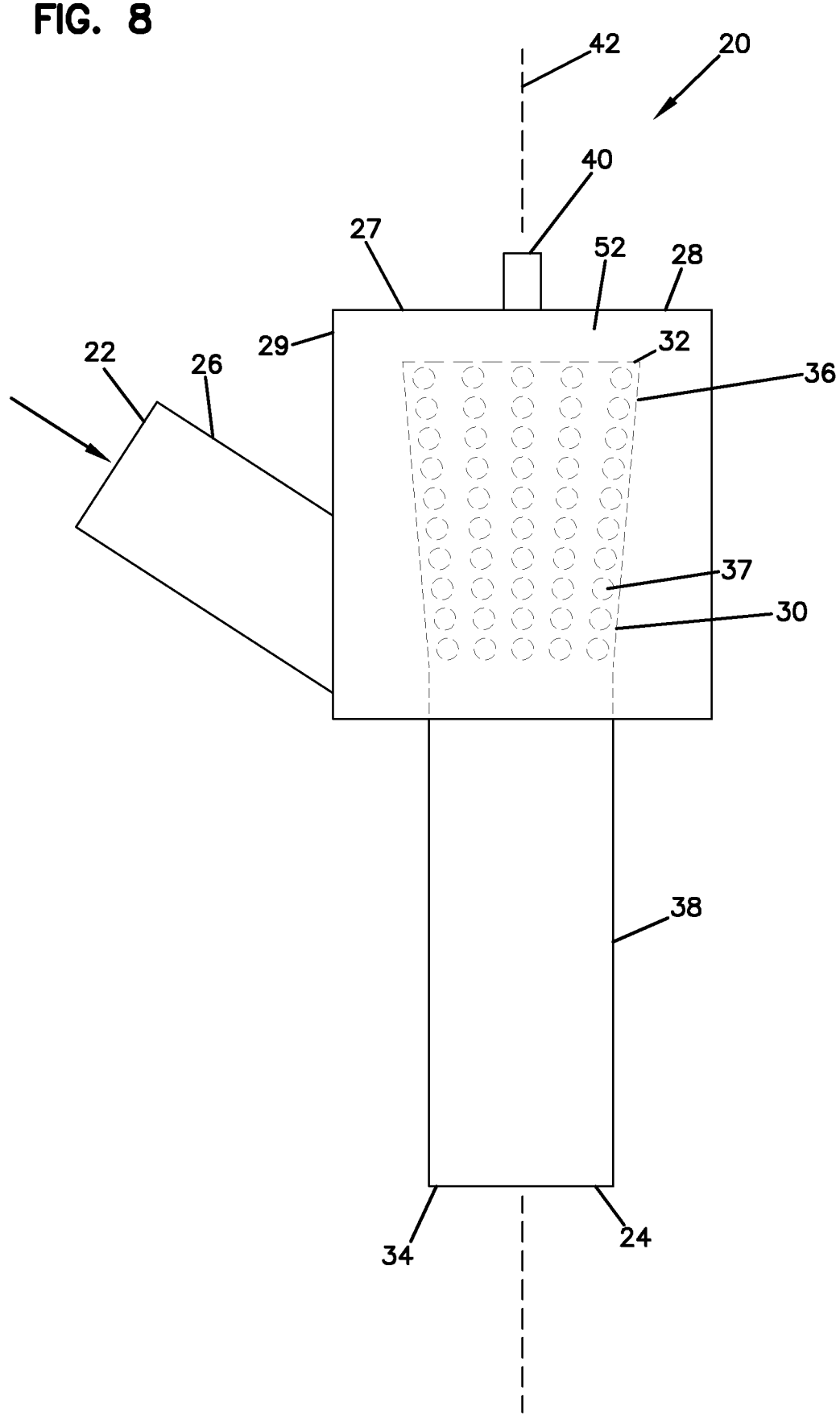
FIG. 8 is a front view of a further exemplary doser and mixing unit in accordance with the principles of the present disclosure.

The mixing tube 30 of the dosing and mixing unit 20 defines the central axis 42 and has a length that extends along the central axis 42 from the first end 32 to the second end 34 of the mixing tube 30. The mixing tube 30 is cylindrical in shape and has in some embodiments (shown in FIGS. 1-7) a constant diameter along the entire length of the mixing tube 30. Thus, the first and second portions 36, 38 of the mixing tube 30 have constant diameters along their respective lengths. Also, the first and second portions 36, 38 of the mixing tube 30 are shown having equal diameters. In some embodiments (shown in FIG. 8), the first end 32 of the mixing tube 30 has a larger diameter than the second end 34. In some embodiments, the first portion 36 of the mixing tube 30 has a diameter that gradually decreases along its length towards the second portion 38. The first end 32 of the mixing tube 30 is blocked by the top end 27 of swirl housing 28 so that exhaust flow can not pass through the first end 32 of the mixing tube 30. In some embodiments, as is seen in FIGS. 5 and 8, the first end 32 of the mixing tube 30 is arranged at a distance from the top end 27 of the swirl housing 28, forming a gap 52. The doser 40 is positioned at the first end 32 of the mixing tube 30 and is aligned along the central axis

Figure 3:
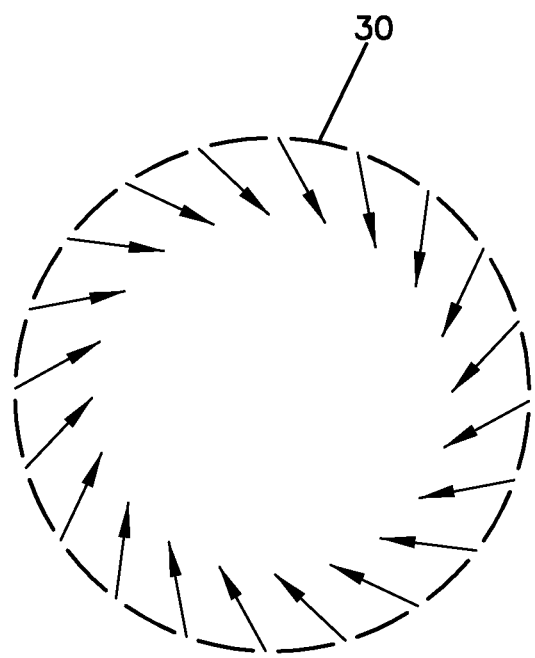
FIG. 3 is a cross-sectional view taken along section line 3-3 of FIG. 1.

42. As shown at FIGS. 3 and 4, the swirling motion of the exhaust can increase in intensity as the swirling exhaust moves axially through the first portion 36 of the mixing tube in a direction toward the second portion 38 of the mixing tube 38. Thus, by the time the exhaust enters the second portion 38 of the mixing tube 30, the exhaust is swirling at an increased rate.

In certain embodiments, the doser 40 can include an injector that injects reactant in a spray cone aligned along the central axis 42 of the mixing tube 30. The swirling action of the exhaust and the converging flow passing through the apertures 37 (see FIG. 3) assists in narrowing the spray cone angle thereby inhibiting wetting of the interior of the mixing tube 30 and minimizing deposit formation within the mixing tube and downstream from the mixing tube. The swirling action is particularly suited for breaking-up, mixing and evaporating aqueous urea in a relatively short time frame/distance.

The swirl housing 28 at least partially encloses the first portion 36 of the mixing tube 30 and has an arrangement that directs exhaust flow tangentially relative to the outer surface of the mixing tube 30 such that the exhaust swirls circumferentially around the exterior of the mixing tube 30. In one embodiment, the exhaust flows in a single direction (e.g., clockwise relative to the central longitudinal axis as shown at FIG. 2) around at least 75 percent of the outer diameter of the mixing tube 30. In other words, the exhaust flow direction turns at least 270 degrees around the outer diameter of the mixing tube 30. As the exhaust flows around the mixing tube 30, portions of the exhaust progressively enter the interior of the first portion 36 of the mixing tube 30 through the apertures 37. The swirl housing 28 has a curved/bent surface 44 that curves along and opposes the outer surface of the first portion 36 of the mixing tube 30. The surface 44 is arranged to transition progressively closer to the outer surface of the first portion 36 of the mixing tube 30 as the surface extends in the circumferential direction of exhaust flow. In some embodiments (not shown), the mixing tube 30 is arranged such in the swirl housing 28 that the central axis 42 of the mixing tube 30 is not in parallel with a longitudinal axis of the swirl housing 28, i.e. the second portion 28 of the mixing tube 30 extends from the swirl housing 28 in an angled direction.

Figure 9:
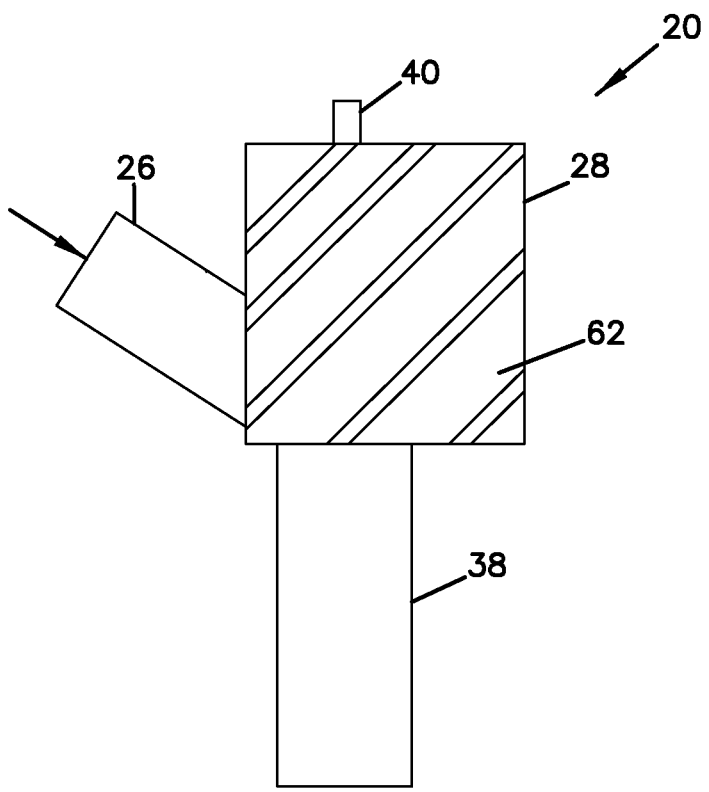
FIG. 9 is a front view of yet an exemplary doser and mixing unit in accordance with the principles of the present disclosure.
Figure 10:
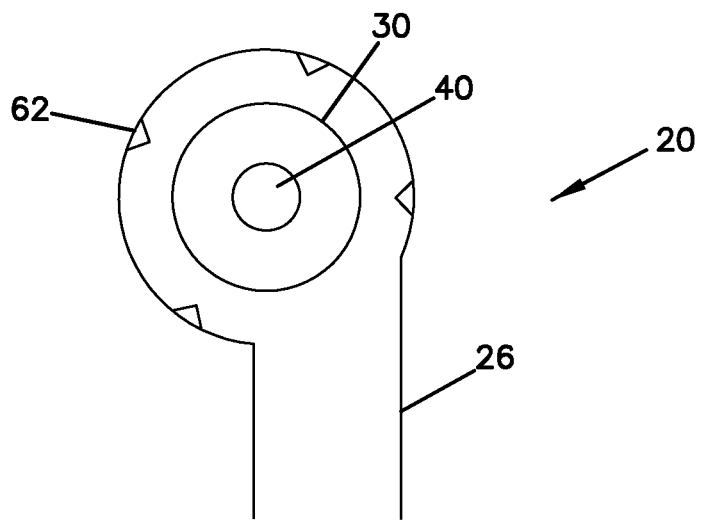
FIG. 10 is a top view of the doser and mixing unit of FIG. 9.

FIGS. 9 and 10 show a dosing and mixing unit 20 that is configured in the same manner and includes the same features as described in conjunction with FIGS. 1-8. The unit 20 further comprises indents 62 or some other kind of profile for causing the exhaust to swirl within the interior of the mixing tube 30. In some embodiments (not shown), the swirl housing 28 includes indents or other kinds of profiles on the inside of the top end 27 for causing the swirl. In other embodiments, the unit 20 includes a screw or helical shaped device arranged around the mixing tube 30 for causing the exhaust to swirl.

Figure 11:
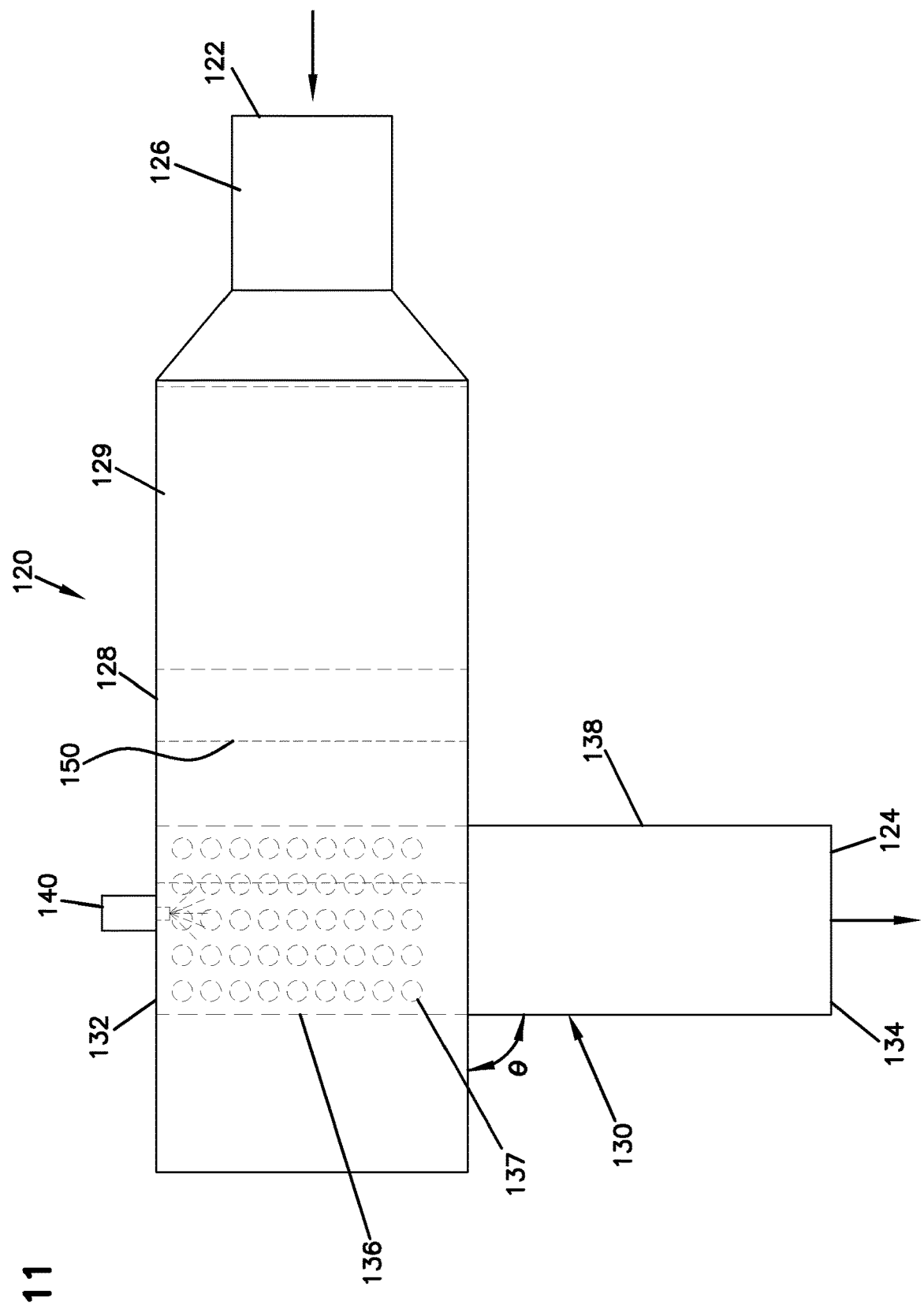
FIG. 11 is a front view of an aftertreatment device having features that are examples of aspects in accordance with the principles of the present disclosure.
Figure 12:
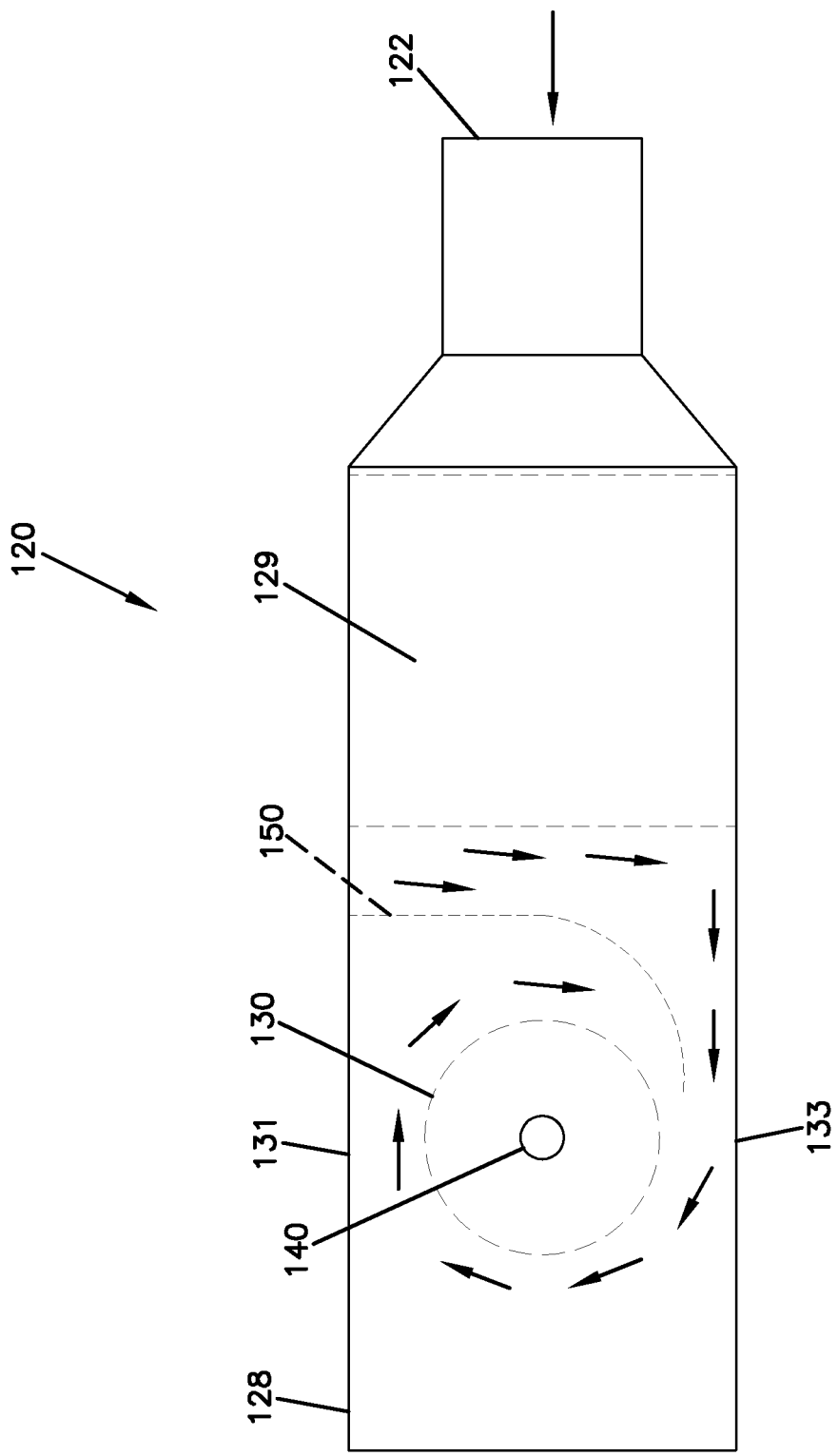
FIG. 12 is a top view of the aftertreatment device of FIG. 11.

FIGS. 11 and 12 show an aftertreatment device 120 in accordance with the principles of the present disclosure. The aftertreatment device 120 includes an inlet 122 and an outlet 124. The inlet 122 is formed by an inlet pipe 126 that extends to a substrate housing 128. A substrate 129 (e.g., a DPF substrate or DOC substrate) is positioned within the substrate housing 128 adjacent to the inlet pipe 126. The aftertreatment device 120 also includes a mixing tube 130 having the same configuration as the mixing tube 30. The mixing tube 130 has a first end 132 positioned within the substrate housing 128 and a second end 134 that forms the outlet 124 of the aftertreatment device 120. The mixing tube 130 has a first portion 136 positioned adjacent to the first end 132 of the mixing tube 130 and a second portion 138 positioned adjacent to the second end 134 of the mixing tube 130. The first portion 136 has a plurality of apertures 137 (e.g., perforations) and the second portion 138 has a solid wall without any apertures. The apertures 137 can be formed as circles, squares, slots or any other shape. The aftertreatment device 120 also includes a doser 140 mounted to the housing 128 adjacent to the first end 132 of the mixing tube 130. The doser 140 is adapted for dispensing reactant into an interior region of the mixing tube 130. A deflector baffle 150 is positioned between the substrate 129 and the first portion 136 of the mixing tube 130. The deflector baffle 150 is configured to cause the exhaust to flow circumferentially in one direction around at least 270 degrees of the exterior of the outer diameter of the first portion 136 of the mixing tube 30. The baffle 150 directs the flow in a tangential direction relative to the outer diameter of the mixing tube 30. In certain embodiments, the mixing tube 130 can be bent so that an out put end of the tube angles away from the inlet 122. In other embodiments, the tube 130 can be straight and the entire tube 130 can be angled at angle θ relative to a central axis of the housing 128. In certain embodiments, the angle θ is in the range of 60-90 degrees. In other embodiments, the angle θ is less than 90 degrees, or less than 80 degrees, or in the range of 60-80 degrees. In other embodiments, the angle θ is 90 degrees. The angle θ is measured between the outer end of the tube 130 and the main body of the housing 128.

In another embodiment, the tube 130 can be offset from the center of the housing 128 so as to be closer to a first side 131 (e.g., a top side) of the housing as compared to a second side 133 (e.g., a bottom side) of the housing 128.

In use of the aftertreatment device 120, exhaust enters the device 120 through the inlet 122 and passes through the substrate 129 where the exhaust is initially treated (e.g., contaminants removed by filtration or chemically through a catalyzed reaction at the substrate). After the exhaust passes through the substrate 129, the baffle 150 causes the exhaust to swirl circumferentially (i.e., tangentially) through a swirl structure about the exterior of the first portion 136 of the mixing tube 130. As the exhaust flow swirls circumferentially around the first portion 136 of the mixing tube 130, the exhaust gas enters the interior of the mixing tube 130 through the apertures 137. The exhaust flow entering the interior of the mixing tube 130 through the apertures 137 has a tangential/circumferential flow component that causes the exhaust to swirl within the interior of the mixing tube 130. The doser 140 dispenses reactant into the swirling exhaust within the interior of the mixing tube where the swirling action of the exhaust assists in uniformly mixing the reactant within the exhaust. Swirling flow of the exhaust continues from the first portion 136 of the mixing tube 130 to the second portion 138 of the mixing tube 130 whereby mixing is enhanced as the exhaust moves through the length of the mixing tube 130. After the swirling exhaust has traveled through the mixing tube in a direction extending from the first end 132 to the second end 134 of the mixing tube 130, the exhaust exits the device 120 through the outlet 124. As is seen in FIG. 12, the swirl structure has a cross-section that gradually decreases along the exhaust flow path.

Figure 13:
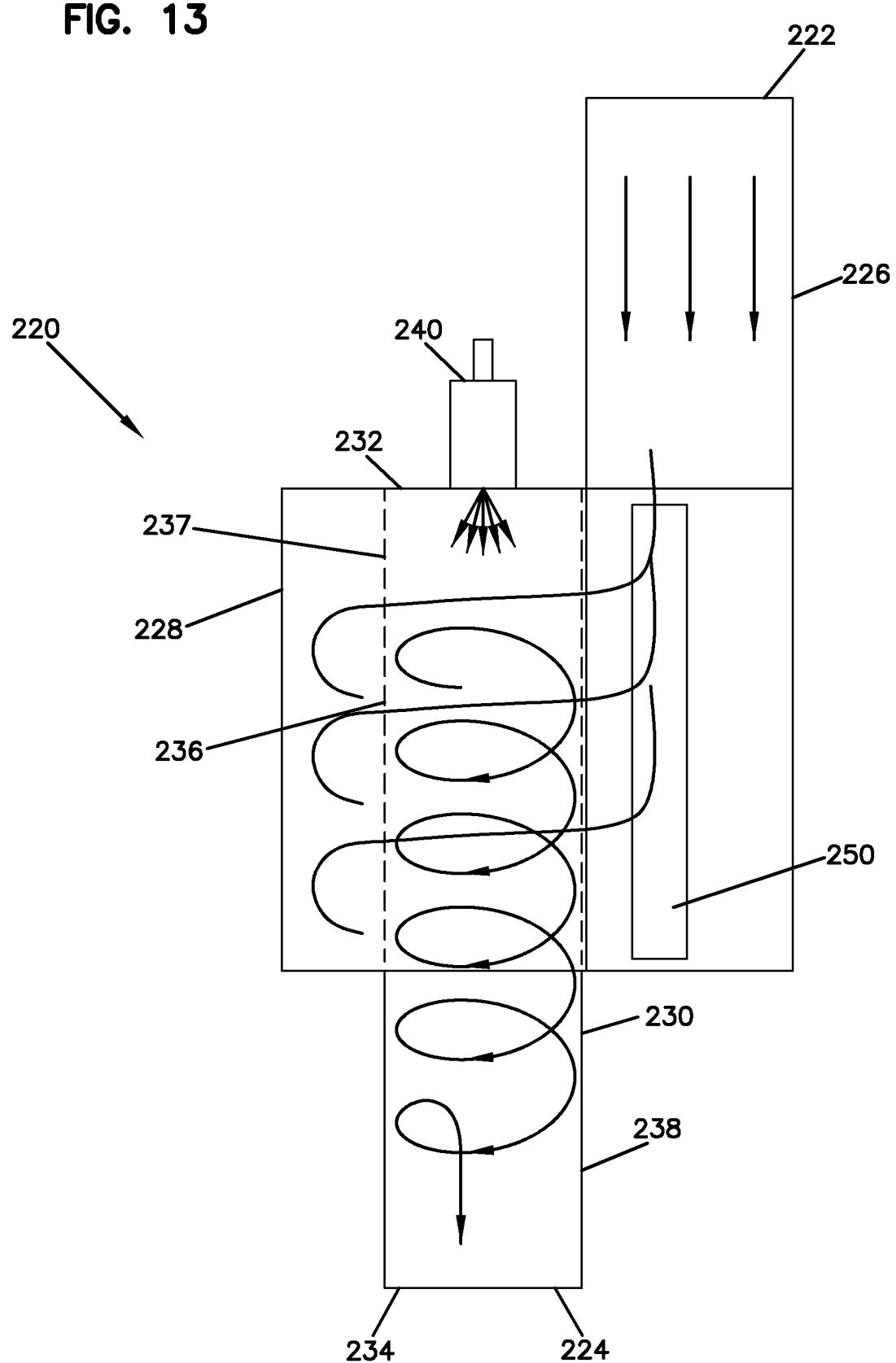
FIG. 13 is a front view of a doser and mixing unit having features that are examples of aspects in accordance with the principles of the present disclosure.

FIG. 13 shows a doser and mixing unit 220 in accordance with the principles of the present disclosure. The unit 220 includes an inlet 222 and an outlet 224. The inlet 222 is formed by an inlet pipe 226 that extends to a swirl housing 228. The unit 220 also includes a mixing tube 230 having the same configuration as the mixing tube 30 shown and described in conjunction with FIGS. 1-10. As can be seen in FIG. 13, the inlet pipe 226 is arranged with a radial offset from a central axis of the mixing tube 230 such that the incoming exhaust through the inlet 222 has a flow direction that is generally in parallel of the direction of the outgoing exhaust through outlet 224. The mixing tube 230 has a first end 232 positioned within the swirl housing 228 and a second end 234 that forms the outlet 224 of the unit 220. The mixing tube 230 has a first portion 236 positioned adjacent to the first end 232 of the mixing tube 230 and a second portion 238 positioned adjacent to the second end 234 of the mixing tube 230. The first portion 236 has a plurality of apertures 237 (e.g., perforations) and the second portion 238 has a solid wall without any apertures. The apertures 237 can be formed as circles, squares, slots or any other shape. The unit 220 also includes a doser 240 mounted to the housing 228 adjacent to the first end 232 of the mixing tube 230. The doser 240 is adapted for dispensing reactant into an interior region of the mixing tube 230. A deflector baffle 250 is positioned within the swirl housing 228 between the inlet pipe 226 and the first portion 236 of the mixing tube 230. The deflector baffle 250 is configured to cause the exhaust to flow circumferentially in one direction around at least 270 degrees of the exterior of the outer diameter of the first portion 236 of the mixing tube 230. The baffle 250 directs the flow in a tangential direction relative to the outer diameter of the mixing tube 230.

As the exhaust flow swirls circumferentially around the first portion 236 of the mixing tube 230, the exhaust gas enters the interior of the mixing tube 230 through the apertures 237. The exhaust flow entering the interior of the mixing tube 230 through the apertures 237 has a tangential/circumferential flow component that causes the exhaust to swirl within the interior of the mixing tube 230. The doser 240 dispenses reactant into the swirling exhaust within the interior of the mixing tube where the swirling action of the exhaust assists in uniformly mixing the reactant within the exhaust. Swirling flow of the exhaust continues from the first portion 236 of the mixing tube 230 to the second portion 238 of the mixing tube 230 whereby mixing is enhanced as the exhaust moves through the length of the mixing tube 230. After the swirling exhaust has traveled through the mixing tube 230 in a direction extending from the first end 232 to the second end 234 of the mixing tube 230, the exhaust exits the unit 220 through the outlet 224.

Figure 14:
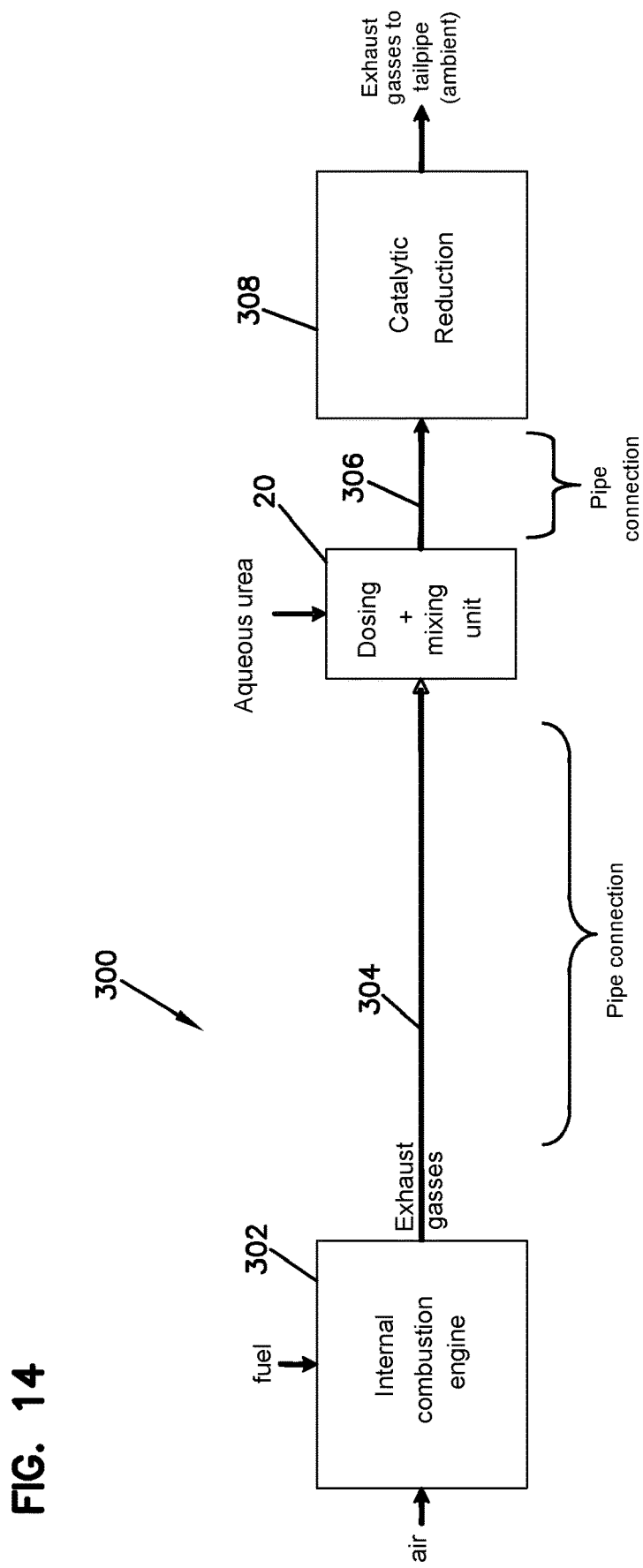
FIG. 14 is a schematic representation of a first exhaust treatment system incorporating a doser and mixing unit in accordance with the principles of the present disclosure.
Figure 15:
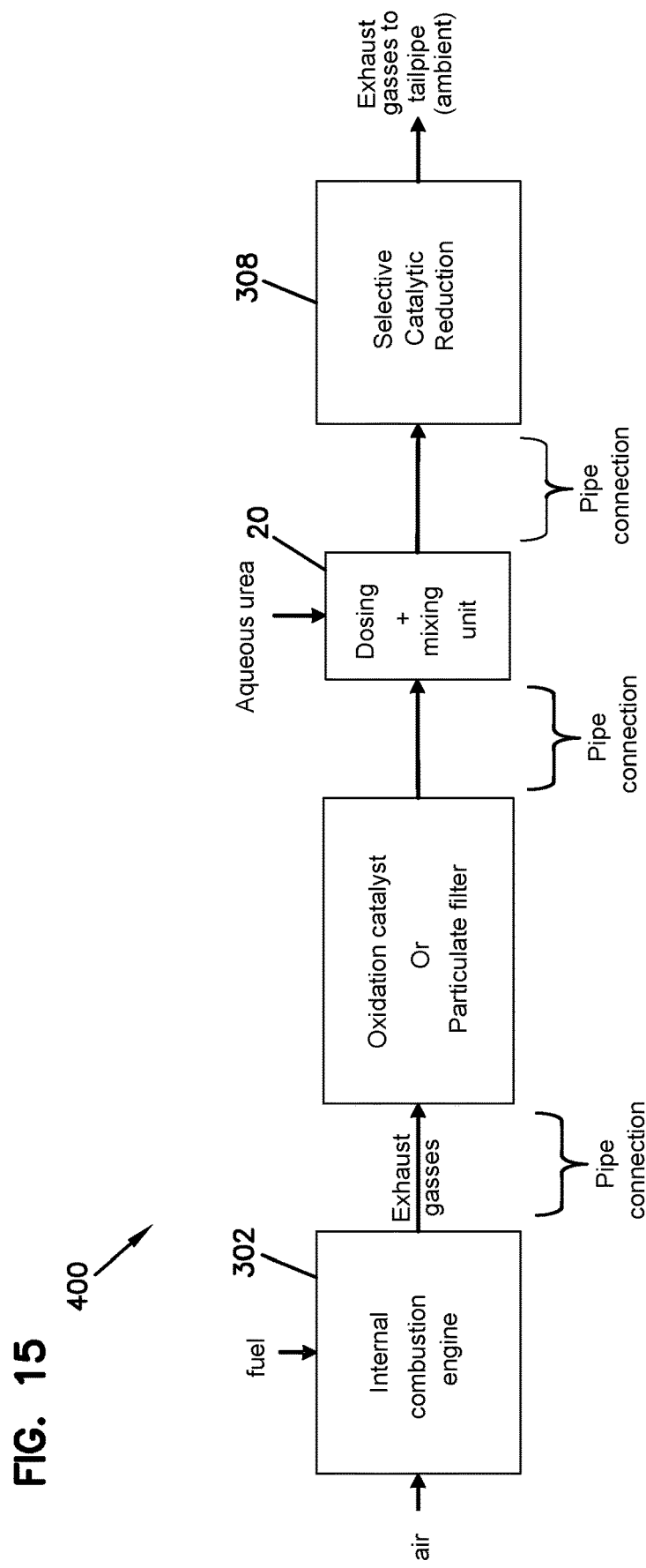
FIG. 15 is a schematic representation of a second exhaust treatment system incorporating a doser and mixing unit in accordance with the principles of the present disclosure.
Figure 16:
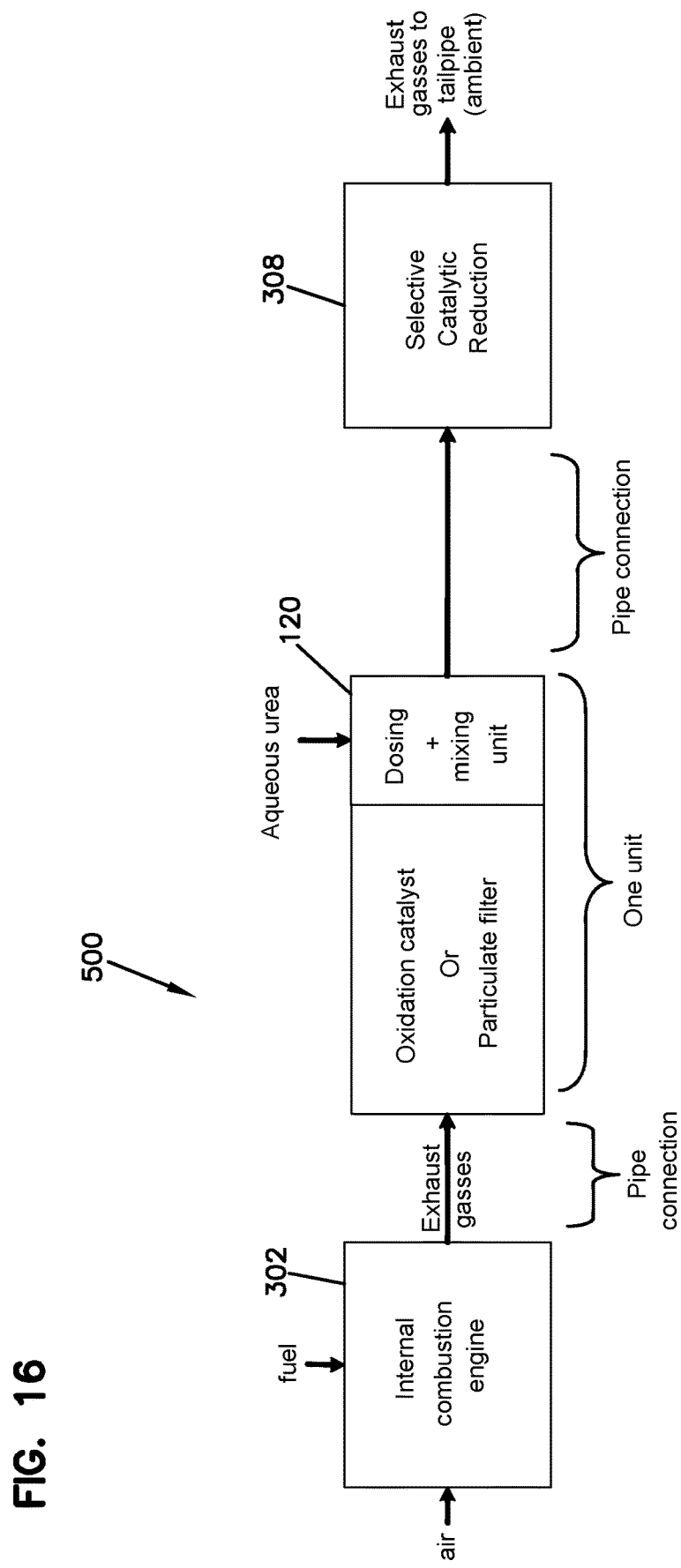
FIG. 16 is a schematic representation of a third exhaust treatment system incorporating a doser and mixing unit in accordance with the principles of the present disclosure.

FIG. 14 shows a system 300 including the dosing and mixing unit 20. The system includes an internal combustion engine 302. A pipe 304 carries exhaust from the engine 302 to the dosing and mixing unit 20 where reactant (e.g., aqueous urea) is injected into the exhaust stream and mixed with the exhaust stream. A pipe 306 carries the exhaust stream containing the reactant to an SCR device 308 where nitrogen oxides are reduced to nitrogen and water. FIG. 15 shows a system 400 that is the same as the system 300 except a separate aftertreatment substrate (e.g., a DPF or DOC) is positioned between the engine 300 and the dosing and mixing unit 20. FIG. 16 shows a system 500 that is the same as the system 300 except the aftertreatment device 120 has been substituted for the dosing and mixing unit 20.

A selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through the doser 40. In alternative embodiments, other aftertreatment devices such as lean NOx catalyst devices or lean NOx traps could be used in place of the SCR catalyst device, and other reactants (e.g., hydrocarbons) can be dispensed by the doser.

A lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment systems 400 and 500 will be described as including an SCR, it will be understood that the scope of the present disclosure is not limited to an SCR as there are various catalyst devices that can be used in accordance with the principles of the present disclosure.

The lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

Figure 17A:
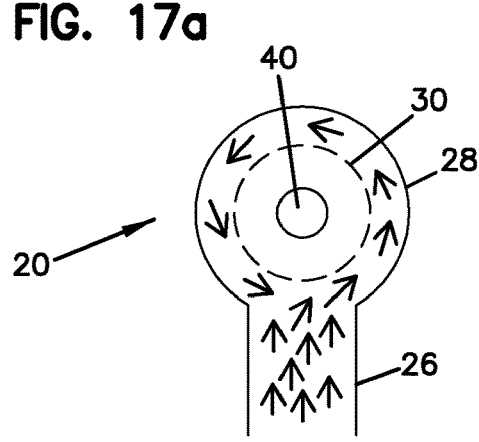
FIG. 17a-17f are top views of a dosing and mixing unit showing different means for creating swirl.
Figure 17B:
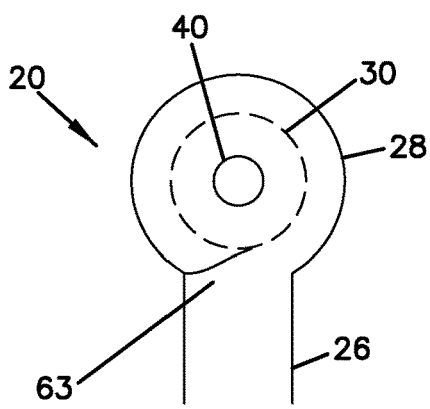
Figure 17C:
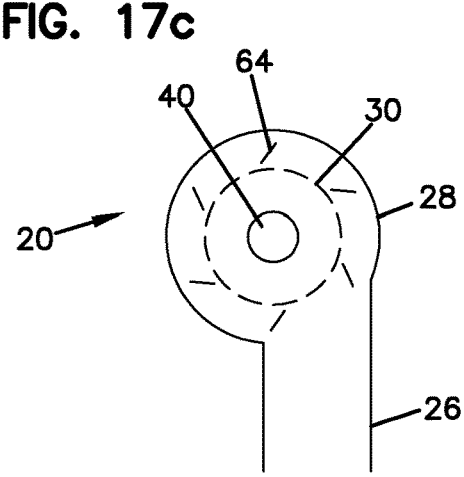
Figure 17D:
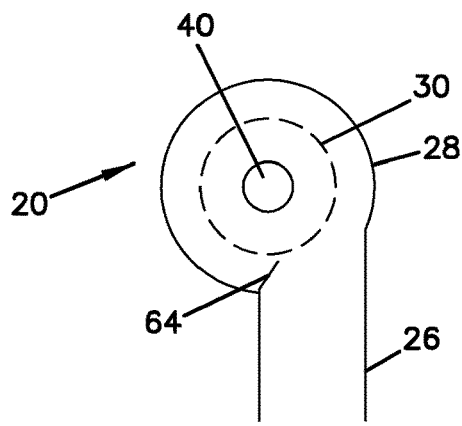
Figure 17E:
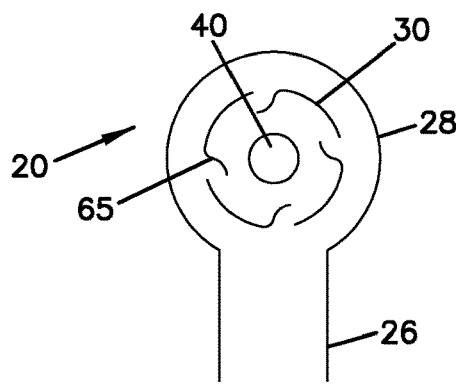
Figure 17F:
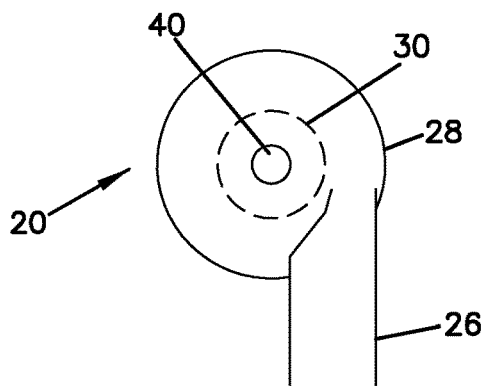

FIGS. 17a-17f are top views of a dosing and mixing unit 20 as described and shown in conjunction with FIGS. 1-10 and show different means for creating exhaust flow swirl. FIG. 17a illustrates a swirl structure that has the same cross-section around the outer diameter of the mixing tube 30. In the embodiment shown in FIG. 17b, the swirl housing 28 includes a stop wall 63 that forces the exhaust flow to enter the mixing tube 30. In the embodiment shown in FIG. 17c, the dosing and mixing unit 20 includes one or more flow guide devices 64 arranged between an outer wall of the mixing tube 30 and an inner wall of the swirl housing 28. The flow guide devices 64 may extend from a bottom of the swirl housing 28 or from a top of the swirl housing 28. The flow guide device(s) 64 may also be arranged on the inner wall of the swirl housing 28 (as shown in FIG. 17d) or on the outer wall of the mixing tube 30 (not shown). Further, according to some embodiments, the mixing tube 30 may be provided with fins 65 inwardly extending from an inner wall of the mixing tube 30 (see FIG. 17e). FIG. 17f illustrates that swirl structure transits from a circular cross-section into an oval or elliptical cross-section along the flow path.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An exhaust aftertreatment device, comprising:
   an inlet and an outlet;
   a main housing body between the inlet and the outlet;
   a mixing tube having a first portion within the main housing body and a second portion, the first portion of the mixing tube defining a plurality of apertures, the second portion of the mixing tube forming the outlet, the mixing tube being provided with fins extending inwardly from an inner wall of the mixing tube;
   a swirl structure for swirling exhaust around an exterior of the first portion of the mixing tube, the swirl structure including a deflector baffle spaced from the mixing tube;
   a doser mount configured to receive a doser adapted to dispense reactant into the mixing tube; and
   an exhaust aftertreatment substrate positioned within the main housing body at a location between the inlet and the first portion of the mixing tube, the exhaust aftertreatment substrate defining a center axis that intersects the mixing tube within the main housing body, the deflector baffle being disposed between the exhaust aftertreatment substrate and the mixing tube.

2. The exhaust aftertreatment device of claim 1, wherein the reactant includes aqueous urea.

3. The exhaust aftertreatment device of claim 1, wherein the swirl structure includes a swirl housing at least partially surrounding the first portion of the mixing tube.

4. The exhaust aftertreatment device of claim 1, wherein the swirl structure has a cross-section that gradually decreases along a flow path.

5. The exhaust aftertreatment device of claim 1, wherein exhaust enters the device through the inlet and passes through the exhaust aftertreatment substrate, where the exhaust is initially treated, and then out through the outlet.

6. The exhaust aftertreatment device of claim 1, wherein the second portion of the mixing tube projects outwardly from the main housing body.

7. The exhaust aftertreatment device of claim 1, wherein the exhaust aftertreatment substrate is a diesel particulate filter or a catalytic converter.

8. The exhaust aftertreatment device of claim 1, wherein the second portion of the mixing tube does not have any apertures.

9. The exhaust aftertreatment device of claim 8, wherein the mixing tube has a first end positioned adjacent the first portion of the mixing tube and a second end positioned adjacent the second portion of the mixing tube, and wherein the second end forms an outlet of the mixing tube.

10. The exhaust aftertreatment device of claim 9, wherein the first end of the mixing tube is closed to exhaust flow, and wherein the doser mount is disposed mounted at the first end of the mixing tube.

11. The exhaust aftertreatment device of claim 1, wherein an inlet pipe forming the inlet is attached to a side of the main housing body and extends out from the side of the main housing body in an angled tangential direction in relation to the mixing tube, wherein exhaust enters the main housing body through the inlet pipe; wherein the swirl structure is configured to cause exhaust flow to swirl outside of the first portion of the mixing tube in one rotational direction along a flow path around a central axis of the mixing tube; wherein the exhaust enters an interior of the mixing tube through the apertures as the exhaust swirls along the flow path; and wherein the exhaust entering the interior of the mixing tube through the apertures has a tangential component that causes the exhaust to swirl around the central axis of the mixing tube within the interior of the same.

12. The exhaust aftertreatment device of claim 11, wherein the mixing tube has a generally constant diameter along its length.

13. The exhaust aftertreatment device of claim 11, wherein the flow path extends at least 270 degrees around the central axis of the mixing tube.

14. An exhaust aftertreatment device, comprising:
an inlet and an outlet;
a main housing body between the inlet and the outlet;
a mixing tube having a first portion within the main housing body and a second portion, the first portion of the mixing tube defining a plurality of apertures, the second portion of the mixing tube forming the outlet, the mixing tube being provided with fins extending inwardly from an inner wall of the mixing tube;
a swirl structure configured to swirl exhaust around the first portion of the mixing tube, the swirl structure extending from a first end to an opposite second end, the swirl structure having a cross-section that gradually decreases between the first and second ends;
a doser mount configured to receive a doser adapted to dispense reactant into the mixing tube; and
an exhaust aftertreatment substrate positioned within the main housing body at a location between the inlet and the first portion of the mixing tube, the substrate defining a center axis that intersects the mixing tube within the main housing body.

15. The exhaust aftertreatment device of claim 14, wherein an inlet pipe forming the inlet is attached to a side of the main housing body and extends out from the side of the main housing body in an angled tangential direction in relation to the mixing tube; and wherein exhaust enters the main housing body through the inlet pipe.

16. The exhaust aftertreatment device of claim 14, wherein the mixing tube has a first end positioned adjacent the first portion of the mixing tube and a second end positioned adjacent the second portion of the mixing tube, wherein the first end of the mixing tube is closed to exhaust flow, wherein the doser mount is disposed at the first end of the mixing tube, and wherein the second end forms an outlet of the mixing tube.

17. The exhaust aftertreatment device of claim 14, wherein the swirl structure includes a swirl housing at least partially surrounding the first portion of the mixing tube.

18. The exhaust aftertreatment device of claim 14, wherein the second portion of the mixing tube does not have any apertures.

19. The exhaust aftertreatment device of claim 14, wherein the swirl structure is configured to cause exhaust flow to swirl outside of the first portion of the mixing tube in one rotational direction along a flow path.

20. The exhaust aftertreatment device of claim 19, wherein the flow path extends at least 270 degrees around a central axis of the mixing tube at an exterior of the mixing tube.

21. An exhaust aftertreatment device, comprising:
an inlet and an outlet;
a main housing body between the inlet and the outlet, wherein an inlet pipe forming the inlet is attached to a side of the main housing body and extends out from the side of the main housing body in an angled tangential direction in relation to the mixing tube, wherein exhaust enters the main housing body through the inlet pipe;
a mixing tube having a first portion within the main housing body and a second portion, the first portion of the mixing tube defining a plurality of apertures, wherein the exhaust entering the interior of the mixing tube through the apertures has a tangential component that causes the exhaust to swirl around a central axis of the mixing tube within the interior of the same, the second portion of the mixing tube forming the outlet, the mixing tube being provided with fins extending inwardly from an inner wall of the mixing tube;
a swirl structure for swirling exhaust around an exterior of the first portion of the mixing tube, wherein the swirl structure is configured to cause exhaust flow to swirl outside of the first portion of the mixing tube in one rotational direction along a flow path around the central axis of the mixing tube, wherein the exhaust enters an interior of the mixing tube through the apertures as the exhaust swirls along the flow path;
a doser mount configured to receive a doser adapted to dispense reactant into the mixing tube; and an exhaust aftertreatment substrate positioned within the main housing body at a location between the inlet and the first portion of the mixing tube, the substrate defining a center axis that intersects the mixing tube within the main housing body.

\* \* \* \* \*

UNITED STATES PATENT AND TRADEMARK OFFICE
CERTIFICATE OF CORRECTION

PATENT NO. : 11,608,764 B2  
APPLICATION NO. : 17/222274  
DATED : March 21, 2023  
INVENTOR(S) : Korneel De Rudder Page 1 of 1

It is certified that error appears in the above-identified patent and that said Letters Patent is hereby corrected as shown below:

In the Claims

Column 9, Line 33, Claim 10: "disposed mounted at the first" should read --disposed at the first--

Signed and Sealed this
Twenty-second Day of April, 2025

Coke Morgan Stewart
*Acting Director of the United States Patent and Trademark Office*